K. W. LIEBAU.
BEET HARVESTING MACHINE.
APPLICATION FILED APR. 23, 1918.
1,291,567.
Patented Jan. 14, 1919.
4 SHEETS—SHEET 2.
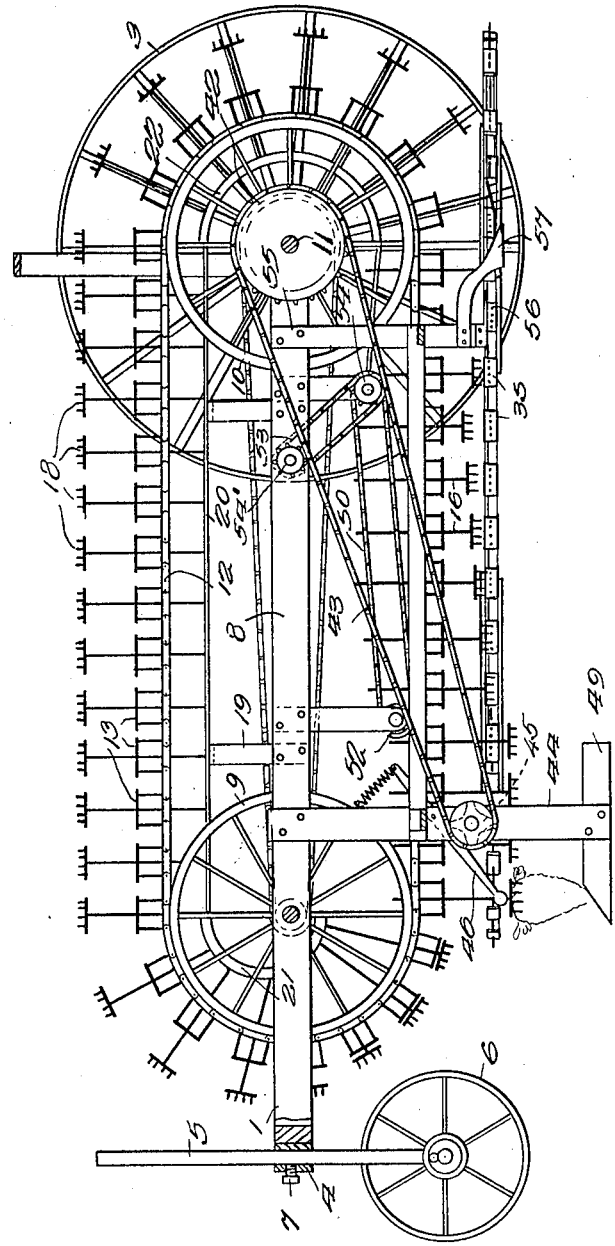
Karl W. Liebau
Inventor
By Geo. P. Kimmel
Attorney K. W. LIEBAU.
BEET HARVESTING MACHINE.
APPLICATION FILED APR. 23, 1918.
1,291,567.
Patented Jan. 14, 1919.
4 SHEETS—SHEET 3.
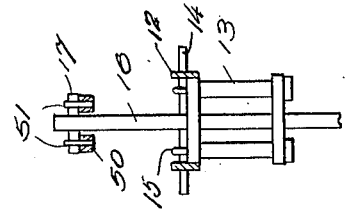
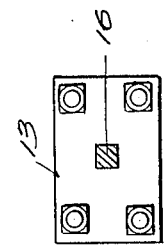
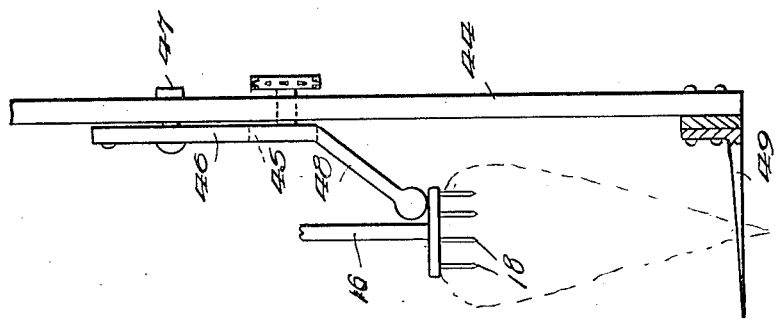
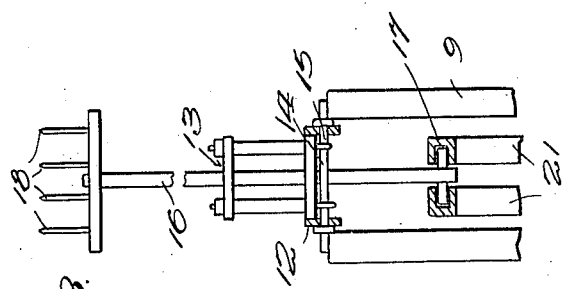
Karl W. Liebau
Inventor
By Geo. P. Kimmel
Attorney

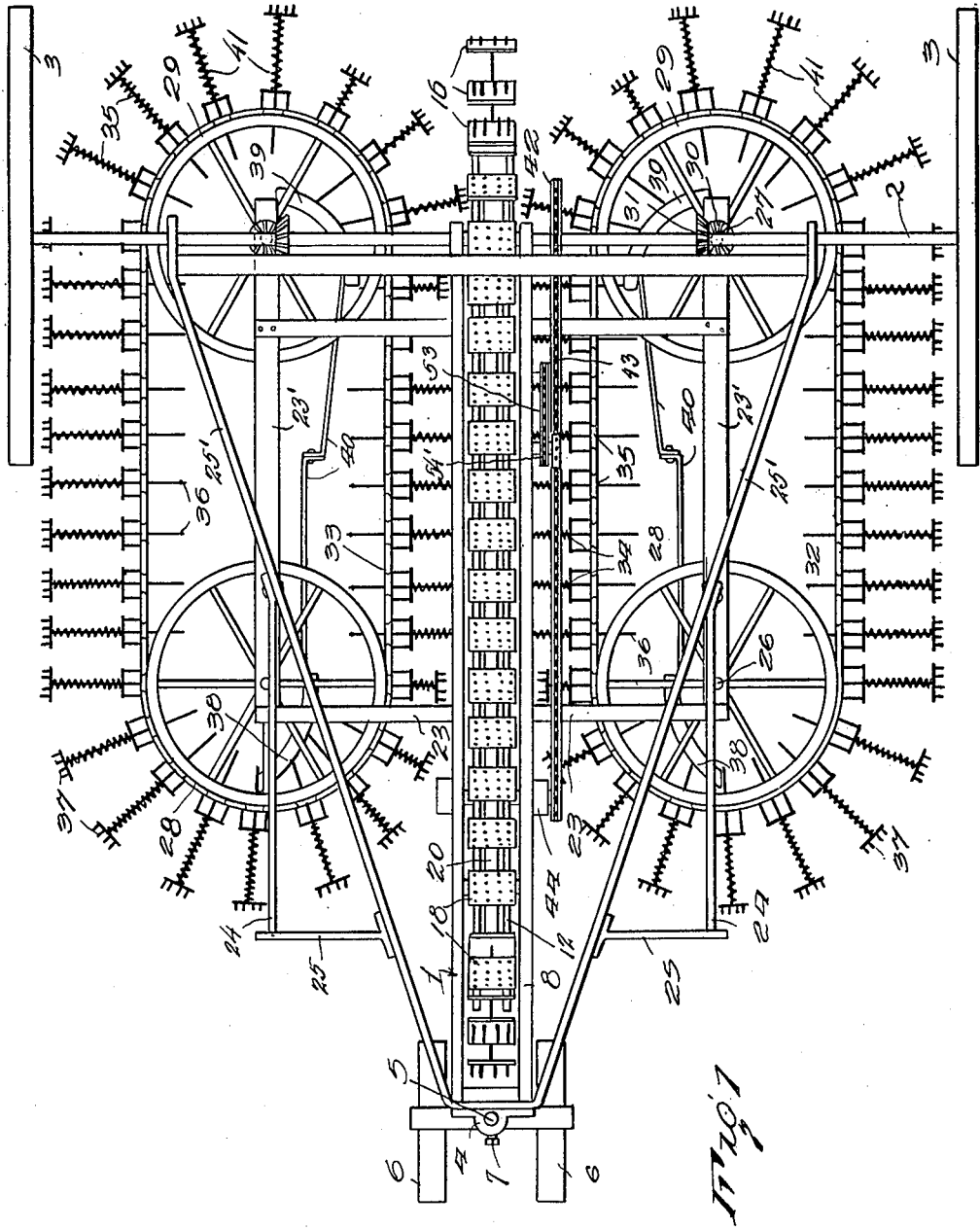

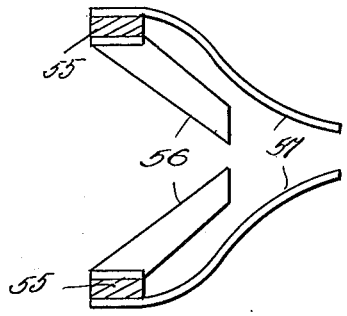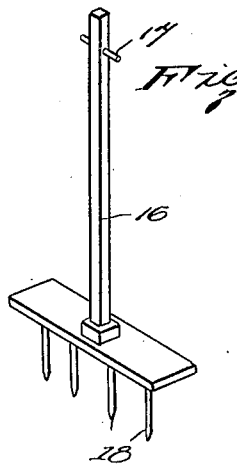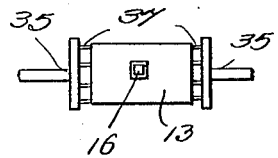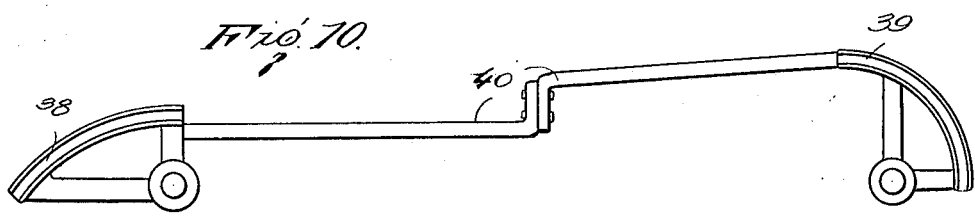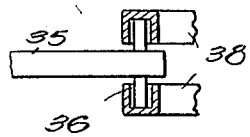

UNITED STATES PATENT OFFICE.

KARL W. LIEBAU, OF OROSI, CALIFORNIA.

BEET-HARVESTING MACHINE.

1,291,567. Specification of Letters Patent. Patented Jan. 14, 1919.

Application filed April 23, 1918. Serial No. 230,306.

*To all whom it may concern:*

Be it known that I, KARL W. LIEBAU, a citizen of the United States, residing at Orosi, in the county of Tulare and State of California, have invented certain new and useful Improvements in Beet - Harvesting Machines, of which the following is a specification.

This invention relates to improvements in beet harvesting machines and has more especial reference to a combined beet pulling and topping machine; the principal object of the invention being to provide a machine which when moved over a field having beets planted therein will loosen the same in the soil, pull the same and then remove the tops therefrom in an exceedingly rapid and efficient manner and without doing material injury to the bulbous roots.

Another and equally important object of the invention is to provide the machine with a novel form of conveying means capable of engaging the beets and removing them from the soil and then conveying the same into engagement with the topping means, whereby the tops will be severed therefrom, said conveying means carrying spearing or impaling elements which are released and engaged with the beets in sequential order and at the proper periods are disengaged therefrom, subsequently to the topping operation.

Other independent objects are to provide features of construction of portions of the machine which tend toward the attainment of the above aims irrespective of the relation in which they are used.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings, wherein is shown one of various possible embodiments of my invention:

Figure 1 is a top plan view of the improved machine,

Fig. 2 is a vertical longitudinal section therethrough,

Fig. 3 is a fragmentary vertical section through certain of the conveying means, Fig. 4 is a fragmentary detail partly in section of the earth working element and the hammer for causing the vertically disposed impaling elements to be engaged with the beets, Fig. 5 is a detail in perspective of one of the impaling elements, Fig. 6 is a top plan having parts in section showing the topping knives and the detaching arms, Fig. 7 is a fragmentary detail showing the manner in which the horizontally disposed impaling elements are engaged with beets arranged therebetween, Fig. 8 is a detail showing the mounting of the impaling elements, Fig. 9 is a horizontal section through one of the impaling elements showing the mounting therefor, Fig. 10 is an elevation in detail of the guide ways for the horizontally disposed impaling elements, and Fig. 11 is a fragmentary transverse section through the same and a fragment of one of the stems of the impaling elements engaged therein.

Having more particular reference to the drawings, the improved machine includes a triangular frame indicated in its entirety by the numeral 1, the rear portion of the frame being provided with suitable bearings whereby a power transmitting axle 2 having wheels 3 is mounted upon its opposite extremities and received therein. A vertically disposed bearing collar 4 is arranged on the forward end of the frame 1 and rotatably receives the spindle 5 therethrough, which spindle as will be noted, carries a suitable form of axle having wheels 6 mounted thereon. To permit adjusting of the frame with relation to the spindle 5, a set-screw 7 is arranged in the bearing collar 4 and as will be noted is adapted to engage the adjacent portion of the spindle. In this way, the forward end of the frame may be raised or lowered as desired. A secondary frame 8 is arranged longitudinally of the main frame 1 and has spaced pulley wheels 9 and 10 mounted on shafts 11 supported thereby, which wheels, as will be noted, receive a chain 12 of the endless type thereabout. This chain 12 carries a plurality of bearing elements 13 comprising substantially square apertured plates, which are arranged upon the opposite extremities of a plurality of bolts; the inner plate being secured to the chain by means of transversely disposed pins 14, as at 15 which are of lengths such as will permit engagement between the chain and the spaced pulley wheels 9 and 10.

Spearing or impaling members 16 are provided and as will be noted, are formed with stems substantially square in cross section and carrying pins 17 upon their free extremities, while a plurality of teeth 18 are carried upon a transversely disposed head arranged on the remaining ends. Vertical arms 19 are secured to the sides of the secondary frame 8 and carry upon their upper ends a longitudinally disposed bar 20 having its opposite ends communicating with guide ways 21 and 22, the guide way 21 comprising opposed curved channeled members substantially U-shaped in cross section and arranged eccentric to the mounting of the pulley wheels 9, while the guide 22 also comprises curved opposed channeled strips, which in this instance, are arranged substantially concentric to the mounting of the pulley wheels 10. In this connection, it will be understood that the curved guide ways 21 and 22 serve to receive the pins 17 arranged in the free ends of the stems of the impaling elements 16, thus causing movement of said elements in predetermined directions, for a purpose hereinafter more fully described.

Laterally disposed supporting arms 23 are secured to the opposite sides of the secondary frame 8 at points in proximity to the forward end thereof and support longitudinally disposed bars 24 on their outer ends, certain of the ends of said bars being engaged in the outer ends of brackets 25 secured to the sides of the main frame 1 at points in proximity to its forward end. Mounted on the main frame are spaced vertically disposed shafts 26 and 27 carrying spaced pulley wheels 28 and 29, corresponding in size and construction to the wheels 9 and 10; the several shafts 27 having beveled gears 30 mounted on their upper extremities and meshing with other beveled gears 31 carried by the power transmitting axle 2. In this way, it is obvious that rotary motion will be imparted to the wheels 29. About the spaced pulley wheels 28 and 29, endless chains 32 and 33 are arranged, it being noted, that said chains are identical and therefore, reference will be hereinafter had to but one of the same and the elements carried thereby. Bearing elements 34, similar to those indicated by the numeral 13, are secured to the sprocket chain 32 and receive the squared stems of horizontally disposed impaling elements 35 therethrough, the inner ends of said stems carrying transversely disposed pins 36, while the outer ends thereof are provided with transversely disposed heads having a plurality of teeth 37 arranged thereon.

Segmental guide ways 38 and 39 are secured to the several supporting arms 23 and to the opposite portions of the rear end of the main frame 1, at points in proximity to the shafts 26 and 27 and as will be noted, comprise opposed channeled strips, substantially U-shaped in cross section and adapted to receive the opposite ends of the transversely disposed pins 36 therein, at times. To brace the guide ways 38 and 39 and to positively prevent relative movement thereof, bars 40 are provided and are connected thereto by a suitable means.

The various horizontally disposed impaling elements 35 are placed under tension by means of expansible coiled springs 41 arranged about the squared stem portions thereof and having bearing on the adjacent portions of the elements 34 and the heads of the same. Thus, it is apparent that the impaling elements will be normally urged outwardly from their respective portion of the endless chains 32 and 33 and as a consequence, when released, in the manner hereinafter described, will immediately move into engagement with the sides of beets, thus positively engaging and conveying the same.

Mounted on the intermediate portion of the axle 2 is a sprocket wheel 42 having one end of a sprocket chain 43 engaged thereabout, the remaining end of said chain extending about a smaller sprocket wheel mounted on an upright 44 which is secured to one side of the secondary frame 8. The shaft carrying the smaller sprocket wheel also carries a rotatable tappet 45 so disposed as to engage and impart vibratory movement to a hammer 46 pivotally mounted on said upright as at 47 and having the lower end thereof off-set as at 48 in order that the same may be sequentially engaged with the transversely disposed heads of the vertical impaling elements 16, thus, imparting sharp blows thereto and driving the same downwardly into the beets to be pulled by the machine.

An earth working element 49 is fixedly secured to the lower end of the upright 44 and serves to engage and loosen the soil about the beets being harvested, thereby facilitating their removal.

To effect the raising or retracting of the vertically disposed impaling elements 16 in order that the same may be disengaged from the beets pulled thereby, an inclined sprocket chain 50 having vertically disposed pins 51 arranged thereon is mounted on spaced sprocket wheels 52, which have motion transmitted thereto by means of another sprocket chain 53, the lower end of which is engaged with a sprocket wheel 54 supported adjacent one of said sprocket wheels 52 and its upper end engaged with a sprocket wheel 54' mounted on the secondary frame 8 and adapted to be normally engaged with the upper portion of the inclined sprocket chain 43 which, as hereinafter stated, is driven from the sprocket wheel 42. Upon movement of the sprocket chain 50, the pins 51 will engage the adjacent pins 17 carried in the free ends of the stems of the impaling elements 16, thereby raising the same causing the teeth of said impaling elements to be withdrawn from the beets.

Other uprights 55 are secured to the secondary frame 8 at a point in proximity to the rear end thereof and have obliquely disposed topping knives 56 secured to their lower ends and arranged adjacent the tops of a horizontally disposed impaling elements 35. Spring arms 57, curved upon themselves, are also engaged with the lower ends of the uprights 55 and serve to engage the beets subsequently to the topping operation in order that they will be disengaged from the teeth of said impaling elements 35 and dropped onto the ground, whereupon they are gathered in suitable receptacles or like means.

The operation of my improved beet harvesting machine may be reviewed as follows:

The machine upon being moved over a field having beets planted therein imparts rotary motion to the spaced pulley wheels 9 and 29; said wheel 9 being mounted on one shaft 11 and having connection with a sprocket chain 9' extended from the axle 2, while the wheels 29 are mounted on the shafts 27 which are connected by the beveled gearing to said axle 2. In this way, rotary motion is imparted to the endless chains 12, 32 and 33, thereby causing the various impaling elements 16 and 35 to be moved in sequential order to positions adjacent the beets to be pulled and conveyed thereby. The impaling elements 16 passing over the pulley wheels 9 will have the pins 17 thereon engaged between the curved guide ways 21 and as a consequence, they will be moved inwardly toward the shaft 11. Upon continued movement of the impaling elements, they will be disengaged from the curved guide ways 21 and will immediately drop by gravity downwardly into engagement with the beets, which as will be understood, are arranged in rows therebeneath. Simultaneously with the engagement of the impaling elements with the beets, the vibratory hammer 46 will be actuated by the tappet 45, thus imparting a sharp blow thereto and driving them downwardly into firm engagement with the beets. Since the soil about the beets so engaged is loosened by the earth working element 49, the beets will be permitted to be removed therefrom and carried to the surface, whereupon they will be engaged by the horizontally disposed impaling elements 35 and carried rearwardly thereby into engagement with the topping knives 56, whereupon the tops will be severed therefrom. Continued movement of the chain 12 will cause the pins 17 in the impaling elements 16 to be moved into engagement with the curved guide ways 22, said elements having been previously disengaged from the beets by means of the inclined sprocket chain 50 which, as hereinbefore stated, serve to engage the pins 17 of the stem thereof and in this way, lift the impaling elements out of engagement with the beets, thus leaving the same free between the horizontally disposed impaling elements 35. As said impaling elements 16 are engaged with the curved guide 22, they will again be moved outwardly and upwardly onto the longitudinally disposed guide bars 20 for reëngagement with the beets being harvested. The impaling elements 35 upon passing about the rear pulley wheels 29 will have the pins 36 carried on the inner ends thereof engaged in the segmental guide ways 39 and as a consequence, they will be drawn out of engagement with the now topped beets, thus, leaving the beets on the soil in rows whereby they can be subsequently gathered. The tops upon being severed from the plants will of course fall from the topping knives 56 onto the ground. Further, by reason of the engagement of the coil springs 41 with the stems of the impaling elements 35, said elements will be moved abruptly into engagement with the beets disposed therebetween when the pins 36 carried thereby are disengaged from the segmental guides 38, thus insuring proper engagement of the teethed heads of the same with said beets.

Manifestly, the construction shown is capable of considerable modification and such modification as is within the scope of my claims, I consider within the spirit of my invention.

I claim:

1. In a beet harvesting machine, a frame, conveying means extending longitudinally thereof, vertically disposed impaling elements slidably carried by said conveying means, means on said frame adapted to be engaged by the impaling elements for raising the same to their uppermost positions and subsequently permitting the dropping of the same into engagement with the beets, and other means arranged adjacent said conveying means engageable with the impaling elements for raising the same out of engagement with the beets.

2. In a beet harvesting machine, a frame, conveying means extending longitudinally thereof, impaling elements slidably carried by the conveying means, curved guide means arranged adjacent the forward end of said frame adapted to be engaged by the impaling elements for raising the same to their uppermost positions and then permitting the dropping of the same onto the beets, and an inclined sprocket chain mounted on wheels carried by the frame with the impaling elements for raising the same out of engagement with the beets.

3. In a beet harvesting machine, a frame, conveying means extending longitudinally thereof, impaling elements slidably carried by said conveying means and adapted to be engaged with the beets, at times, vibratory means engageable with the impaling elements for positively engaging the same with the beets, and other means engageable with said impaling elements for causing the same to be disengaged from the beets.

4. In a beet harvesting machine, a frame, conveying means extending longitudinally thereof, impaling elements slidably carried by the conveying means, curved guide means arranged adjacent the forward end of the frame adapted to be engaged by the impaling elements for raising the same to their uppermost positions and then permitting the same to drop abruptly onto the beets, vibratory means engageable with the impaling elements for causing positive engagement of the same with the beets, and inclined means supported on the frame engageable with said impaling elements for raising the same and causing their disengagement from the beets.

5. In a beet harvesting machine, a frame, vertical and horizontally disposed conveying means extending longitudinally thereof, impaling elements movably carried by said conveying means, and means adapted to be engaged by said impaling elements for moving the same into and out of engagement with the beets at predetermined periods.

6. In a beet harvesting machine, a frame, opposed horizontally disposed and vertically disposed conveying means extending longitudinally thereof, impaling elements slidably carried by said conveying means, guide ways arranged adjacent the forward end of the vertical conveying means adapted to be engaged by the impaling means carried thereon for raising the same to their uppermost positions and then dropping the same abruptly onto the beets, other guide means arranged adjacent the forward ends of the opposed horizontally disposed conveying means and adapted to be engaged by the impaling means thereon for moving the same inwardly and then releasing them, and spring means arranged on said second mentioned impaling means for forcing the same outwardly when released.

7. In a beet harvesting machine, a frame, opposed horizontally disposed conveying means extending longitudinally thereof, vertically disposed conveying means extending longitudinally thereof, impaling elements slidably carried on said conveying means, curved guide means arranged on the frame adjacent the forward end of said horizontally disposed conveying means adapted to be engaged by the impaling elements for moving the same inwardly and then releasing them, spring means engaged with said impaling elements for moving the same outwardly subsequently to the releasing thereof, other guide means carried by the frame adjacent the forward end of the vertical conveying means adapted to be engaged by the impaling means for raising the same to their uppermost positions and then releasing them to abruptly engage the beets, inclined means arranged adjacent said vertical conveying means engageable with the impaling means thereon for raising the same out of engagement with the beets, and other guide means arranged adjacent the rear ends of the horizontally disposed conveying means for moving the same inwardly out of engagement with the beets.

8. In a beet harvesting machine, a frame, conveying means extending longitudinally thereof, impaling elements slidably carried by said conveying means, guide means carried by the frame adapted to be engaged by the impaling elements, at times, for permitting the same to be engaged with the beets and for causing the same to be disengaged therefrom at predetermined periods, earth working means carried by the frame in proximity to the forward end thereof adjacent certain of the conveying means, topping knives carried by the frame adjacent its rear end and disposed in the path of travel of said conveying means, and spring arms arranged in proximity to said topping knives.

9. In a beet harvesting machine, a frame, opposed horizontally disposed conveying means extending longitudinally thereof, impaling elements slidably carried by the conveying means, curved guides arranged on the frame adjacent the forward ends of the conveying means adapted to be engaged thereby for moving the same inwardly and then releasing the same, spring means engaged with said impaling elements for causing their movement into engagement with the beets subsequently to the releasing thereof, vertical conveying means extending longitudinally of the frame intermediate said horizontal conveying means, impaling elements carried by said vertical conveying means, curved guide means on the frame adjacent the forward end of the vertical conveying means adapted to be engaged thereby for raising the same to their uppermost positions and then releasing them for engagement with the beets, a vibratory hammer arranged adjacent the forward end of the vertical conveying means and engageable with the impaling elements for forcing the same into positive engagement with the beets, inclined means arranged on the frame adapted to be engaged with the impaling elements of the vertically disposed conveying means for engaging the same and raising them out of engagement with the beets, earth working elements carried by the forward portion of the frame, other guide means arranged on the frame adjacent the horizontally disposed conveying means adapted to be engaged by the impaling elements thereon for moving the same inwardly out of engagement with the beets, topping knives carried by the frame adjacent its rear end and in the path of travel of said horizontally disposed conveying means, and spring arms arranged adjacent said topping knives.

10. In a beet harvesting machine, a frame, conveying means extending longitudinally thereof, and a plurality of sets of impaling elements slidably carried by said conveying means adapted to be engaged and disengaged from the beets at predetermined periods, said sets of impaling elements being arranged at substantially right angles to each other.

11. In a beet harvesting machine, a frame, conveying means on the frame, and independent slidably arranged impaling elements carried by said conveying means adapted to be engaged and disengaged from the beets at predetermined periods.

12. In a beet harvesting machine, a frame, conveying means on the frame, independent slidably arranged impaling elements arranged on said conveying means disposed at substantially right angles to each other, means engageable with said impaling means for moving the same abruptly into engagement with the beets, and other means for causing the impaling elements to be disengaged from the beets at predetermined periods.

In testimony whereof I affix my signature hereto.

KARL W. LIEBAU.

Copies of this patent may be obtained for five cents each, by addressing the "Commissioner of Patents, Washington, D. C."